US008561089B2

(12) United States Patent  (10) Patent No.: US 8,561,089 B2
Leff et al.  (45) Date of Patent: Oct. 15, 2013

(54) SYSTEM AND METHOD FOR FLEXIBLE AND DEFERRED SERVICE CONFIGURATION

(75) Inventors: Avraham Leff, New Hempstead, NY (US); James T. Rayfield, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 1173 days.

(21) Appl. No.: 11/936,934

(22) Filed: Nov. 8, 2007

(65) Prior Publication Data

US 2009/0125920 A1 May 14, 2009

(51) Int. Cl.
G06F 9/44 (2006.01)
G06F 13/00 (2006.01)

(52) U.S. Cl.
USPC ............ 719/330; 719/315; 719/316; 719/328

(58) Field of Classification Search
None
See application file for complete search history.

(56) References Cited

U.S. PATENT DOCUMENTS

| 6,516,312 | B1* | 2/2003 | Kraft et al. | 707/610 |
| 6,625,590 | B1* | 9/2003 | Chen et al. | 709/223 |
| 7,890,526 | B1* | 2/2011 | Brewer et al. | 707/767 |
| 2002/0138656 | A1* | 9/2002 | Hickey | 709/250 |
| 2003/0051072 | A1* | 3/2003 | Burch et al. | 709/328 |
| 2004/0064447 | A1* | 4/2004 | Simske et al. | 707/5 |
| 2006/0230035 | A1* | 10/2006 | Bailey et al. | 707/5 |
| 2008/0059416 | A1* | 3/2008 | Forbes et al. | 707/2 |

* cited by examiner

Primary Examiner — Andy Ho
Assistant Examiner — Umut Onat
(74) Attorney, Agent, or Firm — Ido Tuchman; William J. Stock

(57) ABSTRACT

A method, system and computer program product for flexible service configuration. In one embodiment, the method includes receiving a procedure request to perform a procedure at a target server, detecting by the target server at least one deficient parameter in the procedure request, suspending processing of the procedure request, sending a request by the target server for additional information from a middleware system to correct the at least one deficient parameter in the procedure request, and resuming the procedure request upon receiving the additional information.

20 Claims, 7 Drawing Sheets

SYSTEM AND METHOD FOR FLEXIBLE AND DEFERRED SERVICE CONFIGURATION

FIELD OF THE INVENTION

The present invention relates generally to the configuration of services. More specifically, the present invention relates to improved techniques for flexibly configuring a service at runtime before a service request is completed.

BACKGROUND

Recent discussion of application architectures has centered around "Service Oriented Architectures". In service oriented architectures, applications are structured as an application-specific portion and a set of reusable "services". The application-specific portion typically contains the user interface and the application logic. The services are typically invoked via remote procedure calls (RPCs). Service oriented architectures are particularly prevalent in applications following the "Web 2.0" paradigm.

One problem with many service oriented architectures known in the art is that the application programming interfaces (APIs) to the reusable services tend to be very "brittle". Brittle means that the usage of and the parameters passed to the service APIs must conform exactly to the specification of the APIs. Therefore, an application programmer must understand the semantics of the service API. The programmer must typically invoke the API with parameters of the correct number, order and type. In practice, this requirement leads to a large number of programming errors resulting from programmers misunderstanding the API. Additionally, significant amounts of time are frequently required to read the API specifications to determine the correct semantics for the API invocations. (In practice, many programmers omit this step, leading to a further increased rate of programming errors.)

Known solutions to this problem of brittle service APIs include the use of Integrated Development Environments (IDEs) such as Eclipse™. Eclipse is a trademark of Eclipse Foundation, Inc., Ottawa, Canada. IDEs known in the art can typically detect and report certain forms of incorrect service API usage. Unfortunately, such checking is typically limited to simple mistakes such as the usage of parameters that are not of the type required by the API. IDEs typically cannot detect errors caused by an incorrect understanding of the APIs semantics. Specifically, IDEs generally cannot detect whether the value of a parameter passed to the service is correct. This is especially true when parameters are passed at runtime because the IDE may not have access to the parameter values at all in such cases.

Furthermore, loosely or dynamically typed programming languages such as JavaScript™, PHP and Python® are increasing in popularity. JavaScript is a trademark of Sun Microsystems, Inc., Santa Clara, Calif., United States, in the United States or other countries. Python is a registered trademark of the Python Software Foundation, Hampton, N.H., United States. For loosely or dynamically typed languages, IDEs generally cannot verify that parameter types are correct. This indicates that IDEs will become less capable of detecting incorrect usage of a service API.

Another approach to the problem of brittle service APIs is to "configure" the service to use certain default parameter values or certain sets of profile-based parameter values. The service is explicitly configured, to a greater or lesser extent, in a separate "configuration" phase before the service is actually used. This beneficially reduces the number of parameters that must be passed to the service API and the number of API invocations that must be performed by the user of the service. This approach is used by so-called "application configuration wizards" such as MySQL® Server Instance Configuration Wizard. MySQL is a registered trademark of MySQL AB, Uppsala, Sweden in the United States, the European Union and other countries.

A notable problem with this approach is that services are frequently configured and invoked by different people. Therefore, the people configuring a service frequently cannot do so effectively because they have insufficient knowledge of how the service will ultimately be invoked. Furthermore, in services known in the art, such configuration is typically performed before the service is invoked. Thus, the configuration process cannot utilize beneficial information which is only obtained when the service is invoked, such as the history of the API's usage in a specific environment.

Other approaches to the problem of brittle service APIs comprise interacting with users of the service to get information that may improve the service delivered to the user. The idea is that the user may be the person best qualified to specify the set of parameter values that must be passed to the service API. For example, users of the Google™ search service are familiar with the service suggesting, in response to the user's search parameters, that the user may have intended to supply a similar, but different, search parameter. Google is a trademark of Google Inc., Mountain View, Calif., United States. The user can then adopt the service's suggestion and reinvoke the service using the revised set of parameters.

However, a notable disadvantage of these approaches is that they require the service to first complete a service request before interacting with the user to configure a subsequent service request. In certain cases, such as when a service request may take a long time to complete or when completing the service request may cause damage that is difficult to reverse, completing the service request before interacting with the user is clearly disadvantageous.

SUMMARY OF THE INVENTION

Embodiments of the present invention address the above-mentioned limitations of the prior art by enabling services to configure themselves in a manner that is out-of-band, deferred and flexible. Deferred means that the service may be configured at the time that the service's API is invoked. This advantageously enables the API and its usage to be similar and, hence, less error-prone. Flexible means that various types of incorrect or incomplete user input can be handled successfully. Out-of-band means that execution of a service request is suspended. While the request is suspended, a separate set of interactions provides advantageous configuration information. Finally, after the configuration information is provided, the original service request is resumed with the benefit of the configuration information. Out-of-band interaction enables interacting with a user to configure a service before completing a service request in many cases.

Service configuration according to the present invention may be provided using middleware that can provide this function in a general fashion to multiple services and their APIs. This beneficially allows the services to delegate much of the required configuration to the middleware.

Thus, one exemplary aspect of the present invention is a method for flexible service configuration. The method includes receiving a procedure request to perform a procedure at a target server. The procedure request requires at least one parameter. The method further includes detecting by the target server at least one deficient parameter in the procedure request, the at least one deficient parameter being unrelated to user authentication. The method further includes suspending processing of the procedure request. The method further includes sending a request by the target server for additional information from a middleware system to correct the at least one deficient parameter in the procedure request. The request includes an identity of the at least one deficient parameter and an explanation of how the at least one deficient parameter is deficient. The method further comprises resuming the procedure request upon receiving the additional information.

Another exemplary aspect of the present invention is a system for flexible service configuration. The system includes a middleware system. The middleware system comprises a configuration specification unit configured to receive a request for additional information to correct at least one deficient parameter in a procedure request and to transmit the additional information in response to the request. The system further includes a target server. The target server includes an interface unit configured to receive a procedure request to perform a procedure, the procedure request requiring at least one parameter. The target server further includes a configuration processing unit configured to detect at least one deficient parameter in the procedure request, to suspend processing of the procedure request, to request additional information from the middleware system to correct the at least one deficient parameter in the procedure request, and to resume the procedure request upon receiving the additional information. The target server and the middleware system may be contained within a client-server system architecture.

Another exemplary aspect of the present invention is a computer program product embodied in computer readable memory comprising computer readable program codes. The computer readable program codes are configured to cause the program to receive a procedure request to perform a procedure. The procedure request requires at least one parameter. The computer readable program codes are further configured to cause the program to detect at least one deficient parameter in the procedure request, with the at least one deficient parameter being unrelated to user authentication. The computer readable program codes are further configured to cause the program to suspend processing of the procedure request. The computer readable program codes are further configured to cause the program to request additional information from a middleware system to correct the at least one deficient parameter in the procedure request. The computer readable program codes are further configured to cause the program to resume the procedure request upon receiving the additional information.

The foregoing and other features, utilities and advantages of the invention will be apparent from the following more particular description of various embodiments of the invention as illustrated in the accompanying drawings.

DETAILED DESCRIPTION OF THE INVENTION

Figure 1:
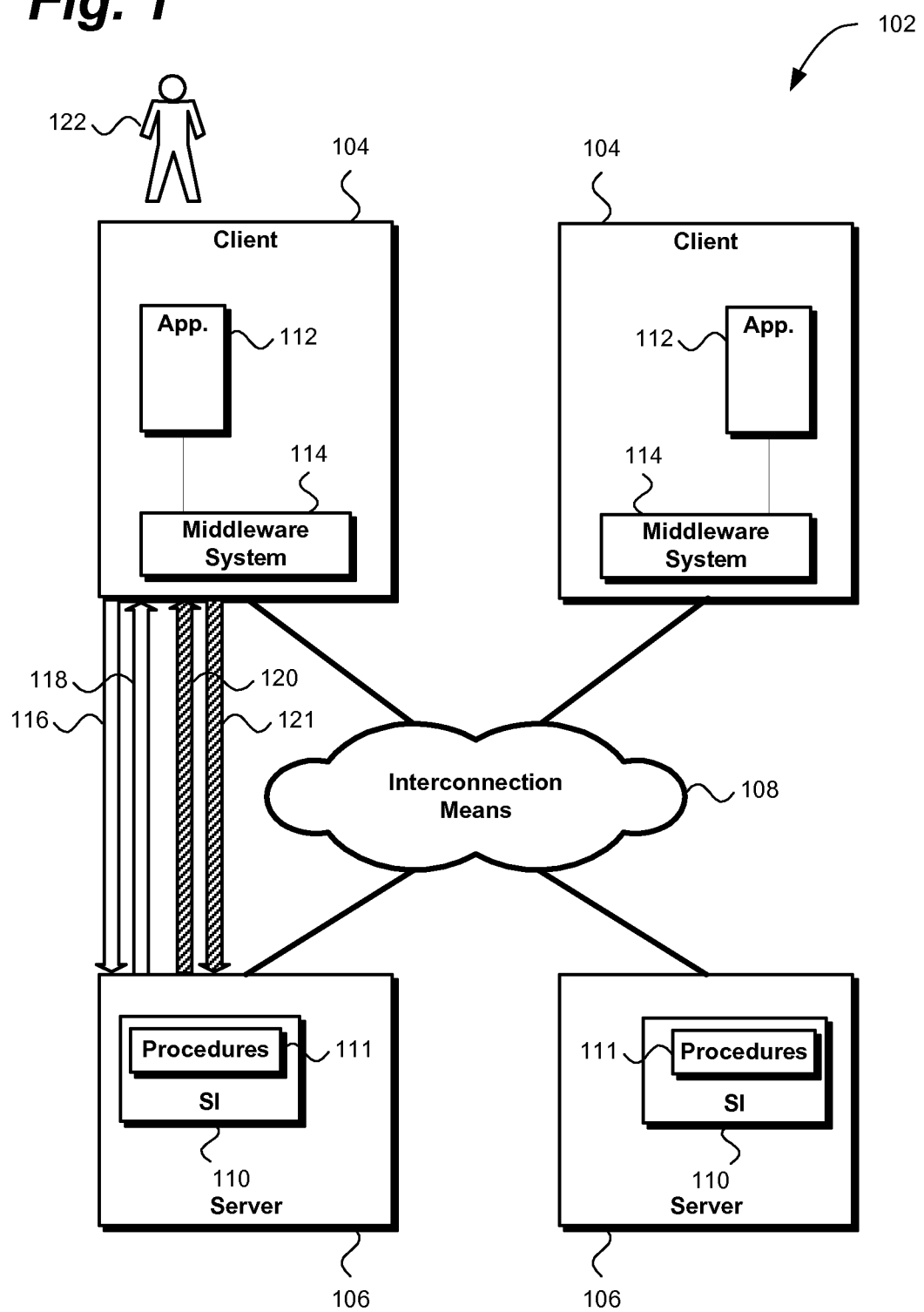
FIG. 1 shows an exemplary system embodying the present invention.

The following description details how the present invention is employed to configure a service in a manner that is deferred, flexible and out-of-band. Throughout the description of the invention reference is made to FIGS. 1-6. When referring to the figures, like structures and elements shown throughout are indicated with like reference numerals.

FIG. 1 shows an exemplary system embodying the present invention. The system 102 may assume any of a wide variety of forms. It may be designed to accomplish any of a variety of goals. The system may be a client/server environment wherein clients and servers are connected via a network.

The system 102 includes one or more clients 104. A client may be implemented in hardware, in software or a combination thereof. A client may be a general purpose computer. Such a computer may be based on a general purpose operating system, such as Windows®, Mac OS® or Linux®. Windows is a registered trademark of Microsoft Corporation, Redmond, Wash., United States, in the United States and other countries. Mac OS is a registered trademark of Apple Inc., Cupertino, Calif., United States. Linux is the registered trademark of Linus Torvalds in the United States and other countries. A client may also be a device other than a general purpose computer. Such devices may include personal digital assistants (PDA's), mobile telephones and any other technological device designed specifically to perform a given task.

A client 104 may be, or may comprise, a web browser. A web browser is a technological device configured to facilitate access to the World Wide Web. The web browser may be a computer program product such as Internet Explorer®, FIREFOX®, Opera®, Safari™ or Konqueror™. Internet Explorer is a registered trademark of Microsoft Corporation, Redmond, Wash., United States, in the United States and other countries. Firefox is a registered trademark of the Mozilla Foundation, Mountain View, Calif., United States. Opera is a registered trademark of Opera Software ASA, Oslo, Norway. Safari is a trademark of Apple Inc., Cupertino, Calif., United States. Konqueror is a trademark of KDE e.V., Tubingen, Germany.

The system 102 further includes one or more target servers 106. A target server may be a general purpose computer. A target server may be based on a general purpose operating system such as IBM® z/OS®, IBM® AIX®, Linux or Windows. IBM, z/OS and AIX are registered trademarks of International Business Machines Corporation, Armonk, N.Y., United States, in the United States, other countries, or both.

The clients 104 and target servers 106 may be connected via an interconnection means 108. The interconnection means may be any of a wide variety of systems known in the art for allowing distinct systems to communicate electronically. The interconnection means may comprise any of a wide variety of networks such as the Internet, the public switched telephone network (PSTN), local area networks (LANs) and wide area networks (WANs). The interconnection means 108 may employ any of a wide variety of network technologies such as Wi-Fi®, WiMAX®, Ethernet, token ring, Digital Subscriber Line (DSL), cable Internet access, satellite Internet access, Integrated Services Digital Network (ISDN) and dial-up Internet access. Wi-Fi is a registered trademark of the Wi-Fi Alliance, Austin, Tex., United States. WiMAX is a registered trademark of the WiMAX Forum, Mountain View, Calif., United States. The interconnection means may comprise direct physical connections, radio waves, microwaves, or any combination thereof.

A target server 106 comprises one or more service implementations 110. A service implementation 110 may implement an interactive computing service. Such a service may, for example, implement the Service Oriented Architectures paradigm. A service implementation may be designed to accomplish any of a wide variety of goals. In an embodiment of the present invention, the service implementation implements a data-query service. Users may query a relational database via service calls to this service. In another embodiment of the present invention, the service implementation implements a workflow service. Users may advance business forms through various stages of a business process via service calls to this service. It is contemplated that the present invention may be employed in conjunction with many commonly used services.

A service implementation may comprise one or more procedures 111. The procedures may be invoked via an application programming interface (API). The API may be implemented by the procedure or by the service implementation. It is emphasized that APIs, as the term is used herein, may include any defined interface by which a first computer program product may interact with a second computer program product. It is contemplated that an API is sufficiently aware of what a user is attempting to accomplish so as to allow detecting values which are nonsensical. For example, the API may require a date input and can detect when the input is not a date.

The present invention may be employed in conjunction with system APIs. Such system APIs may, for example, perform basic system tasks such as data storage. The present invention may also be employed in conjunction with systems and reusable components which are constructed as layers on top of such system APIs.

A service implementation 110 may be implemented in hardware, in software or a combination thereof. The service implementation may include computer program code written in an object oriented programming language such as Java™, C++ or the like. Java is a trademark of Sun Microsystems, Inc., Santa Clara, Calif., United States, in the United States or other countries. The service implementation may also include computer program code written in a conventional procedural programming language, such as the "C" programming language or similar programming languages. The service implementation may also include computer program code written in a multi-paradigm programming language, such as Python or similar programming languages.

The service implementation 110 may be configured to execute under Java 2 Platform, Enterprise Edition (J2EE) or its successor, Java Platform, Enterprise Edition (Java EE). J2EE is a trademark of Sun Microsystems, Inc., Santa Clara, Calif., United States, in the United States or other countries. The service may also be configured to execute under WebSphere®. WebSphere is a registered trademark of International Business Machines Corporation, Armonk, N.Y., United States, in the United States, other countries, or both. The service implementation may also be designed to execute within a programming environment designed specifically for hosting web-based applications and services. Examples of such environments include Java Server Pages (JSP), PHP and Active Server Pages (ASP).

It is not necessary for the service implementation 110 to be located entirely at the target server 106. In particular, a subset of the service implementation may be located at the client 104. Moreover, a subset of the service implementation may be located at a different server or entirely outside the system 102.

A client 104 may comprise one or more applications 112. As the term is used herein, an application may be any system which can submit a procedure request. An application may be designed to accomplish any of a wide variety of goals. An application may be implemented in hardware, in software or a combination thereof. The application may include computer program code written in an object oriented programming language such as Java, C++ or the like. The application may also include computer program code written in a conventional procedural programming language, such as the "C" programming language or similar programming languages. The application may also include computer program code written in a multi-paradigm programming language, such as Python or similar programming languages. The application may also be designed to execute within a programming environment designed specifically for accessing web-based applications and services. Examples of such environments include JavaScript and ActiveX®. ActiveX is a registered trademark of Microsoft Corporation, Redmond, Wash., United States in the United States and other countries.

The system 102 may also comprise one or more middleware systems 114. The one or more middleware systems may beneficially facilitate API interaction through out-of-band communications, as described in more detail below. In the embodiment shown in FIG. 1, a middleware system is located at each client 104. In another embodiment of the present invention, a middleware system is located at a location external to, but accessible by, the client. For example, the middleware system may be connected to the interconnection means 108, and clients may communicate with the middleware system via the interconnection means.

An application 112 located at a client 102 initiates a procedure request 116 to invoke a procedure 111. In the exemplary system shown in FIG. 1, the procedure is located at a service implementation 110. However, it is emphasized that the present invention may be employed in conjunction with procedures which are not part of a service. The procedure request may include one or more parameters. The procedure request 116 may initially be transmitted to the middleware system 114 located at the client, which may in turn retransmit the request. The request may ultimately be received at a service implementation 110 located at a server 106.

The service implementation 110 may determine that additional information should not be collected before fulfilling the procedure request 116. In this case, the service implementation processes the procedure request. The service implementation then returns a result 118 in response to the procedure request. The result may be received at the middleware system 114 located at the client, which may retransmit the result. The result may ultimately be received at the application 112 which initiated the procedure request.

In another scenario, the service implementation 110 may instead determine that additional information should be collected before fulfilling the procedure request 116. This determination may occur because the procedure request contains one or more deficient parameters. However, this determination may occur even when all parameters associated with the procedure request are valid. For example, this determination may occur because additional information would result in a more optimal fulfillment of the procedure request. If it is determined that additional information should be collected, the service implementation suspends the procedure request. The service implementation then transmits a request 120 for additional information. The request may describe specific information which is requested. The request may be received at the middleware system 114.

It is emphasized that the additional information requested may include configuration information. A wide variety of systems known in the art require configuration information to be supplied. For example, for a database system, the data schema and tables may need to be configured before the database can hold data. Even once the database system is configured, an application server may also need to be configured to connect to the database server before the application server can access the data located thereat. Lightweight Directory Access Protocol (LDAP) servers are another example of systems known in the art which require configuration. However, the additional information is not limited to configuration information. To the contrary, additional information may comprise a wide variety of possible types of data. In one embodiment of the invention, the additional information is unrelated to user authentication. Moreover, the request for additional information may including an identity of one or more deficient parameter and an explanation of how the deficient parameter is deficient.

In response to a request 120, the additional information 121 specified by the request may be collected from a user 122. This advantageously allows the service, which has the most accurate information about what configuration is required, to interact with the user, who has most accurate information about what he or she wishes the service to do. The user may be a human being. Alternatively, the user may be another technological device implemented in hardware, software or a combination thereof. The middleware system 114 may interact with the user to collect the requested information. Collecting the requested information may be achieved by any of a variety of prompts and user interface techniques which are well known in the art. For example, a form may be displayed to the user via a display medium, and the user may input the requested information into the form via an input medium. After the additional information has been collected, it is transmitted and is ultimately received at the service implementation 110. After receiving the information, the service implementation resumes the suspended request.

It is emphasized that this sequence of operations causes any configuration information previously requested to be made available to the service implementation 110. It is emphasized that appropriate configuration values can thereby be obtained at runtime. Because the information requested was provided by the user 122 at the present time, information which is available only to the present user may advantageously be made available to the service implementation. Similarly, information which is available at the present time, but which was not available at a previous point in time, may advantageously be made available to the service implementation.

The service implementation 110 is not limited to obtaining configuration information by the methods described above. The service implementation may additionally be configured based on the histories of previous interactions. Learning techniques may also be applied in configuring the service implementation. All of these types of information may be integrated to maximize the effectiveness of configuration. It is emphasized that applications may thereby be gradually trained and, over time, may learn an optimum configuration.

Figure 2A:
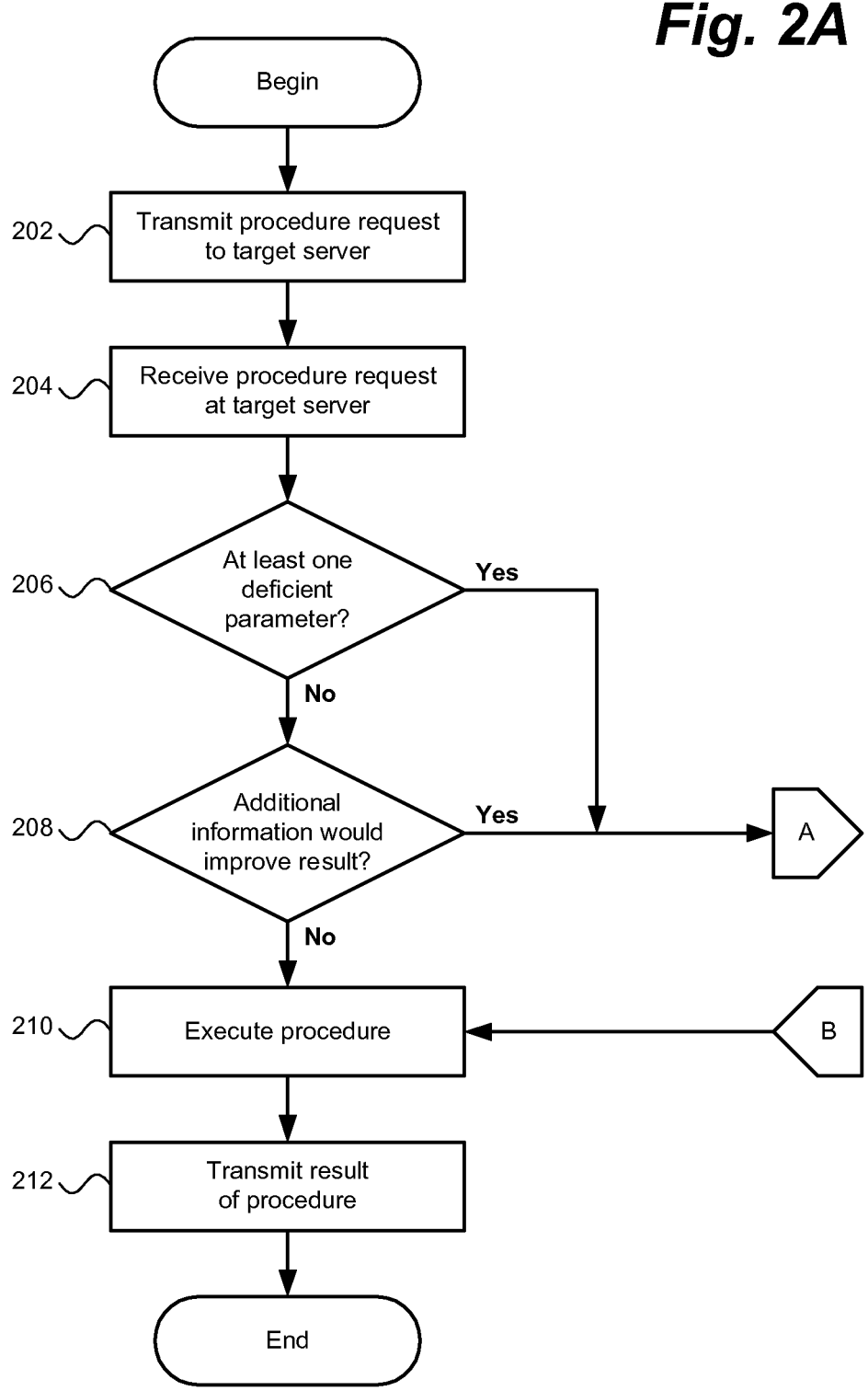
FIGS. 2A and 2B show an exemplary flowchart of operations for flexible service configuration.
Figure 2B:
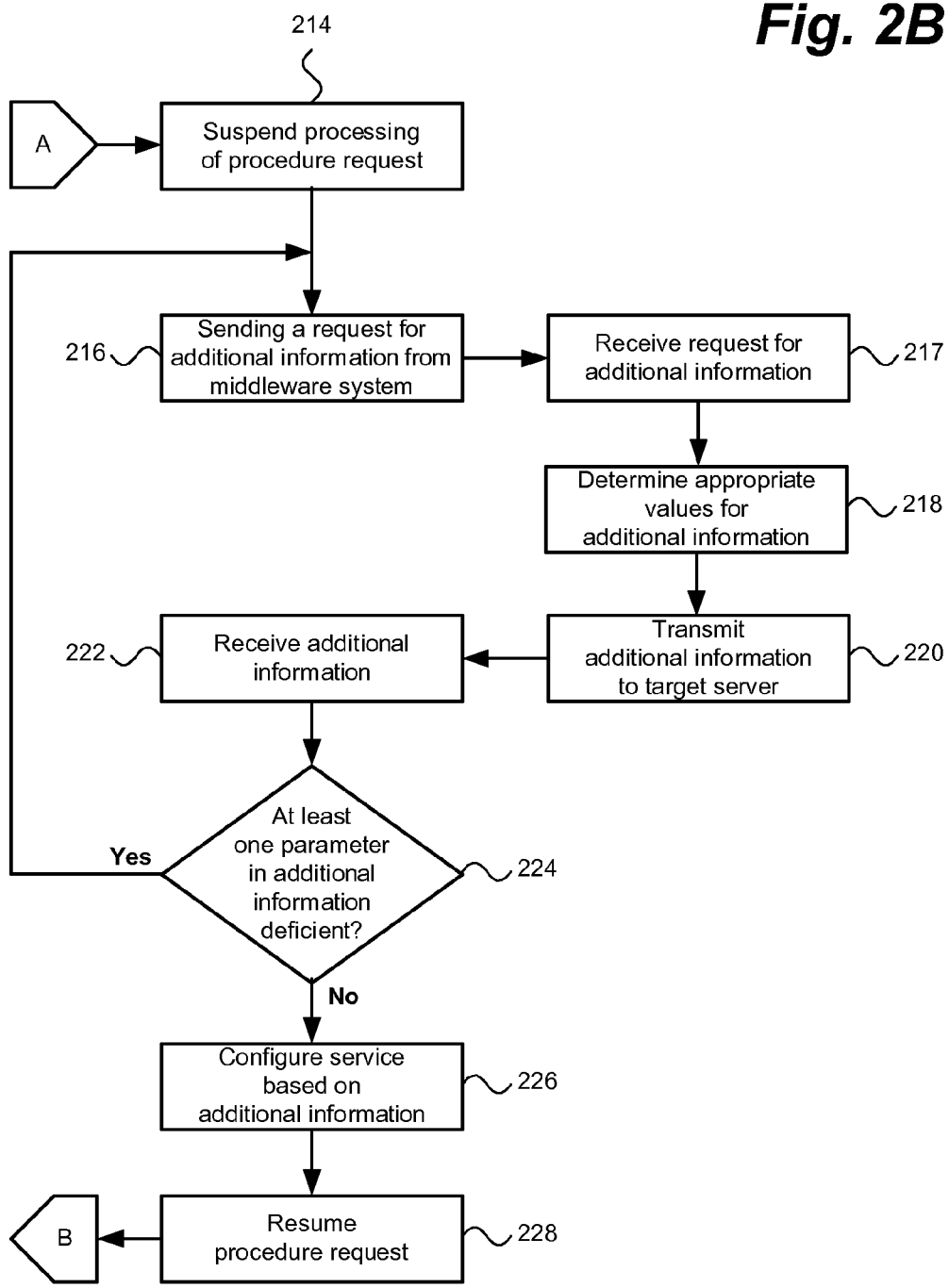

Turning now to FIGS. 2A and 2B, an exemplary flowchart of operations for flexible service configuration is shown.

At transmitting operation 202 on FIG. 2A, a procedure request is transmitted to a target server. The procedure request specifies that a procedure at a target server should be invoked. The procedure may be located within a service. In an embodiment of the present invention, the procedure is located at a service implementation such as the service implementation 110 of FIG. 1. It is emphasized, however, that the present invention may also be employed by procedures which are not associated with services.

The procedure invoked by the procedure request need not be located entirely at the target server. Specifically, the procedure may comprise both code located at the target server and code located at another server. For example, the procedure may comprise both code located at the target server and code located at a client such as the client 104 of FIG. 1.

The procedure request may be a remote procedure call (RPC). The procedure request may communicate with an application programming interface (API) implemented by the procedure or by a service containing the procedure. A wide variety of protocols known in the art may be employed to transmit the procedure request. Moreover, the procedure request may be expressed in any of a wide variety of forms. One or more parameters may be included in the procedure request. The parameters may be of any of a variety of data types. Such data types may include integers, floating-point numbers, characters or strings thereof, Boolean values, arrays of any of the preceding data types and objects.

The target server may be similar in nature to the target server 106 of FIG. 1. The procedure request may be transmitted directly from a client, such as the client 104 of FIG. 1, to the target server. The procedure request may also be transmitted from a client to a middleware system, which may then retransmit the procedure request to the target server. The middleware system may be similar in nature to the middleware 114 of FIG. 1.

Receiving operation 204 may begin whenever any part of the procedure request transmitted by transmitting operation 202 is available. It is noted that network protocols known in the art may allow transmitting and receiving of the procedure request to overlap in time.

At receiving operation 204, the procedure request to perform a procedure at a target server is received at the target server. The procedure request may be received at an API. The procedure request may require at least one parameter. For example, the procedure may require that the procedure request contains specific parameters in order to be valid.

In an embodiment of the present invention, the procedure request is intercepted by computer code which is separate from the procedure being invoked. Procedure requests may be intercepted in all cases regardless of the values of their parameters. Procedure requests may instead be intercepted only after analyzing the values of the parameters, e.g., by performing determining operation 206 and determining operation 208 described below. In another embodiment of the present invention, the procedure is invoked by the procedure request without being intercepted. The procedure then executes determining operation 206 and determining operation 208.

It is noted that in the discussion below, the fact that a parameter which a procedure is configured to receive is absent may itself be considered to be a parameter. This may include cases where a parameter is simply omitted from the procedure request. Similarly, this may include passing Null or the like as the value of a parameter. Null is a construct available in many programming languages and environments known in the art which indicates the absence of data. In particular, Null commonly signifies that no data exists in a context, such a specific field, where that data would normally exist. Accordingly, a parameter which was not passed at all may be considered to be a deficient parameter if the parameter is required.

After receiving operation 204 is completed, control passes to determining operation 206.

At determining operation 206, the target server determines whether the procedure request contains at least one deficient parameter. It is contemplated that a parameter is considered to be deficient if it is required but is absent from the procedure request. Thus, determining operation 206 determines, at a minimum, whether the procedure request contains sufficient information to process the request. It is contemplated that the deficient parameter may be unrelated to user authentication.

Determining operation 206 may also perform sophisticated validation of the parameters included in the procedure request. Accordingly, a parameter may be considered to be deficient if it is likely to result in suboptimal execution of the procedure request. Clearly, if it is known in advance that a parameter will result in incomplete or incorrect execution of the procedure request, that parameter may be considered to be deficient. Similarly, a parameter may be considered to be deficient if it will cause a harmful result such as loss of data. However, a parameter may be considered to be deficient even if it will cause the procedure request to execute successfully. For example, if a procedure request will execute successfully for both a first parameter and a second parameter, but if the second parameter will cause results which are superior to the results caused by the first parameter, the first parameter may be considered to be deficient.

A wide variety of criteria may be applied to determine whether a parameter is deficient. The criteria may specify syntactic requirements for the parameter. For example, the criteria may specify that a parameter is required and is deficient if absent. The criteria may specify that the parameter must be of a specific data type. It is emphasized that the possible syntactic requirements which may be applied to a parameter are not limited to those listed herein. The criteria may also specify semantic requirements for the parameter. For example, the criteria may specify that the parameter must be within a specified range of values. The criteria may further specify that the parameter must be an element of a set of valid values. Criteria which are not purely syntactic and which are not purely semantic may also be employed to determine whether a parameter is deficient. Furthermore, a history of previous invocations of a service may provide an indication that a parameter is deficient.

For example, the data-query service described in FIG. 1 may require the name of a table in a database to be specified by passing the table name as a parameter. If a user omitted this information, the procedure request may not include this parameter. The procedure request may instead include this parameter but with a value of Null or the like. In either case, determining operation 206 may determine that the parameter is deficient. The parameter may similarly be determined to be deficient if, for example, it is of a data type other than a character string, if it is a character string with a length of zero, if its length exceeds the maximum length allowed by the database for table names or if it contains a character which the database does not allow in table names.

As another example, the workflow service described in FIG. 1 may require the name of the person who should process the next stage of a business process to be passed as a parameter. If a user omitted this information, the procedure request may not include this parameter or may include the parameter with a value of Null. Thus, determining operation 206 may similarly determine that the parameter is deficient.

If at least one deficient parameter was detected in the procedure request, control passes to suspending operation 214 on FIG. 2B. Otherwise, control passes to determining operation 208.

At determining operation 208, the target server determines whether additional information would improve the result of the procedure request. The additional information may include parameters which are accepted by a procedure but which were not included in a particular procedure request. For example, consider a procedure request wherein a parameter which is optional was omitted. It may be determined that based on the values of the other parameters, having a value for the omitted optional parameter would be highly advantageous. Additional information may also include information which does not correspond to any parameter accepted by a procedure. Specifically, determining operation 208 may confirm that all information in a list of required information is present. Any information on the list which is absent may be requested as additional information. Additional information may also request clarification related to one or more parameters.

It is noted that determining operation 208 beneficially allows API calls to require only basic information to be passed as parameters. The API call need not even accept all required information as parameters. This is because determining operation 208 allows any required information which is absent to be collected from the user.

If it is determined that additional information would improve the result of the procedure request, control passes to suspending operation 214 on FIG. 2B. Otherwise, control passes to executing operation 210.

At executing operation 210, the procedure specified by the procedure request is executed. It is contemplated that parameters included in the procedure request are passed to the procedure.

It is emphasized that the procedure may have been partially executed prior to executing operation 210. For example, the procedure may have performed determining operation 206 and/or determining operation 208. In fact, this is advantageous because the procedure may encapsulate knowledge about the syntax and semantics of its parameters and about whether additional information would improve its result.

At transmitting operation 212, results of executing operation 210 are transmitted to the application which initiated the procedure request. It is noted that the procedure request may fail even if none of the parameters passed to the procedure were determined to be deficient. In such cases, transmitting operation 212 may transmit an indication that the procedure request failed. Once transmitting operation 212 has finished, processing of the procedure request is complete.

Turning now to FIG. 2B, at suspending operation 214, processing of the procedure request is suspended. Suspending processing may comprise any action which causes the procedure to appear, from the point of view of a user and/or the originator of the procedure request, to be suspended. For example, a process at the target server which is processing the procedure request may be suspended. However, it is emphasized that despite the frequent use in the art of the term "suspending" in regards to processes, suspending operation 214 is not limited to suspension of a process at the operating system level.

At sending operation 216, the target server requests additional information from a middleware system. The request describes the additional information which is requested. The request may be performed to correct at least one deficient parameter in the procedure request. However, some or all of the additional information requested may be unrelated to any deficient parameter. For example, if determining operation 208 determined that additional information would improve the result of the procedure request, the additional information requested may be completely unrelated to any deficient parameter.

The additional information requested may comprise configuration information. It is emphasized that this causes the procedure at the target server to be configured at run-time.

The request for additional information may be performed in an out-of-band manner. In particular, the request may be transmitted over a different communication path than the original procedure request.

The request may describe the additional information which is requested. The description may identify one or more input fields which should be included in the additional information. The description may specify information for each input field such as a field name, a data type and text to be displayed to a user to explain the purpose of the input field. The description may also specify a list of valid values for an input field so that a user may select an option from the list of valid values. For example, if one of the input fields should contain the name of a database table, a list of database tables may be included in the request so that a user may select a database table from the list.

The request may comprise an exception. An exception is a programming construct known in the art which indicates that an unusual condition exists. Those skilled in the art will appreciate that exceptions are frequently intended to trigger a sequence of operations which differs from the sequence of operations followed during normal processing. The exception may be generated and transmitted by the procedure or by a service implementation such as that shown in FIG. 1.

It is emphasized that requesting operation 216 need not be performed after suspending operation 214. Suspending operation 214 may instead be performed after requesting operation 216. Suspending operation 214 and requesting operation 216 may also be performed simultaneously.

Receiving operation 217 may begin whenever any part of the request transmitted by requesting operation 216 is available. At receiving operation 217, the request for additional information to correct the at least one deficient parameter in the procedure request is received at the middleware system. After receiving operation 217 is completed, control passes to determining operation 218.

At determining operation 218, appropriate values for the additional information requested by the target server are determined. Determining operation 218 may comprise interacting with a user to gather the additional information. Specifically, determining operation 218 may comprise the exemplary sequence of operations shown in FIG. 3. Determining operation 218 may also comprise any other sequence of operations configured to determine appropriate values for the additional information. After determining operation 218 is completed, control passes to transmitting operation 220.

At transmitting operation 220, the additional information determined at determining operation 218 is transmitted from the middleware system to the target server.

Receiving operation 222 may begin whenever any part of the procedure request transmitted by transmitting operation 220 is available. As previously noted, transmitting and receiving of the additional information may overlap in time. At receiving operation 222, the additional information transmitted at transmitting operation 220 is received. After receiving operation 222 is completed, control passes to determining operation 224.

At determining operation 224, it is determined whether, in the additional information received at the target server, at least one parameter is deficient. Determining operation 224 may be performed at the target server. Determining operation 224 may repeat some or all of the steps performed at determining operation 206 and/or determining operation 208. Determining operation 224 may also comprise validation steps not previously performed at either determining operation 206 or determining operation 208. It is contemplated that this may occur when the additional information requested from the middleware system is different from the parameters received in the original procedure request.

Upon a determination that at least one parameter is deficient, the steps of requesting the additional information from the middleware system and determining whether at least one parameter is deficient are repeated until the condition wherein at least one parameter is deficient is determined not to exist. Thus, if determining operation 224 determines that at least one parameter is deficient, control passes to requesting operation 216. Otherwise, control passes to configuring operation 226.

It is noted that the resulting control flow will generally cause a loop which repeats until additional information which contains no deficient parameters is received. However, upon receiving additional information with no deficient parameters, it may nonetheless be determined that it is advantageous to receive yet more additional information. Thus, the loop may repeat until the received input values, including the parameters of the procedure request and all additional information requested, appear to be sufficient to execute the procedure request. The number of times the loop is repeated may have no upper bound.

At configuring operation 226, a service is configured based on the additional information. The procedure invoked by the procedure request may be a part of the service thus configured. Additional detail on configuring a service is provided in regards to the configuration implementation unit of FIG. 5.

At resuming operation 228, the procedure request is resumed. Resuming the process may cause it to continue processing from the state existing before the process was suspended at suspending operation 214. Resuming the procedure request may consist of any action which causes the procedure to appear, from the point of view of a user and/or the originator of the processing request, to be resumed. Broadly speaking, resuming operation 228 may reverse any steps performed during suspending operation 214. After resuming operation 228 is completed, control passes to executing operation 210 on FIG. 2A. It is contemplated that any additional information received at any iteration of receiving operation 222 is made available to executing operation 210. Thus, the additional information may modify the behavior and result of executing operation 210.

Figure 3:
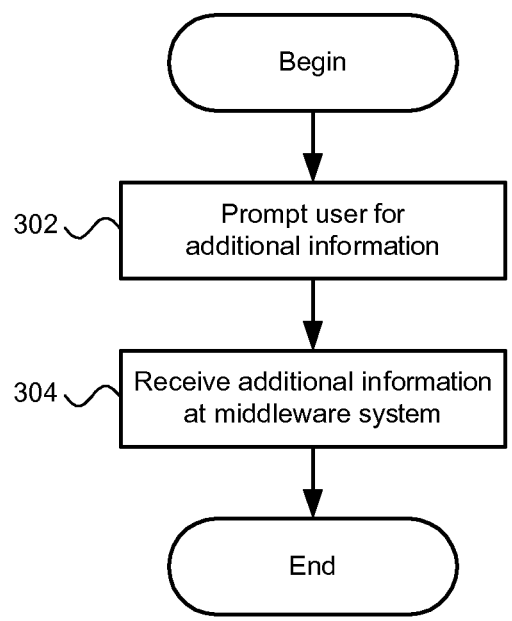
FIG. 3 shows an exemplary flowchart of operations for interacting with a user to gather additional information requested by the target server.

FIG. 3 demonstrates an exemplary flowchart of operations for interacting with a user to gather additional information requested by the target server.

The exemplary operations demonstrated in FIG. 3 may be performed by a middleware system. The middleware system may be similar in nature to the middleware system 114 shown in FIG. 1. It is contemplated that the middleware system performs the exemplary operations demonstrated herein in response to a request for additional information transmitted at requesting operation 216 of FIG. 2B. Thus, the exemplary operations may interact with a user to gather the additional information specified by the request. The operations described herein may be substeps of determining operation 218 of FIG. 2B.

Because the operations shown in FIG. 3 may be performed entirely by a middleware system, it is contemplated that the computer program product which transmitted the original procedure request does not need to include any computer code configured to process the request for additional information. This is advantageous because the amount of computer code required to process requests for additional information is thus reduced.

At prompting operation 302, the middleware system prompts a user to obtain the additional information specified by the request. As previously noted, the additional information requested may comprise configuration information. The user may be similar in nature to the user 122 of FIG. 1.

Prompting operation 302 may comprise displaying at least one form to the user. A form may be a user interface device displaying one or more fields in a visual format. A user is provided the opportunity to enter information into the fields thus displayed. Typically, a mechanism is provided for the user to submit the form once the user has completed entering the data. Forms are particularly well known in the art for web-based applications but are also common and advantageous in traditional stand-alone applications.

Broadly speaking, the form requests specific information from the user. The form may additionally make suggestions regarding the input which the user should supply.

The request for additional information may be employed to construct and display the form. If the request identified one or more input fields to be included in the additional information, the form will generally include each such input field. The field name for each input field, which is typically not displayed visually, may be as specified in the additional information. If the request for additional information includes text to be displayed to a user to explain the purpose of the input field, that text may be displayed on the form in proximity to the input field to assist the user. For example, the request may include text which labels a field as "Database table name". The text may additionally state that the table name was previously omitted by the user. Any such text may be displayed in the form near the input field so that the message therein is communicated to the user.

Furthermore, if the request for additional information specifies a data type for an input field, the form may take into account the data type. For example, an input field which only accepts small integers may require less space than an input field allowing free-form text entry. The request may even include specific instructions regarding how the form is to be arranged visually.

If the description specifies a list of valid values for an input field, the form may include a user interface element allowing the user to select an option from the list of valid values. A drop-down list may be included in the form wherein each valid value is an option in the drop-down list. In the exemplary field labeled "Database table name", the list of valid values could include the name of each table in the database. Thus, a drop-down list could be displayed wherein each database table is included as an option in the drop-down list. A message in the request stating that the user should select a table from the list could be displayed on the form.

The interaction with the user at prompting operation 302 may be sophisticated. For example, if a procedure request incorrectly reversed the order of a parameter intended to hold the name of a database table and a parameter intended to hold a user name, the target server may detect the fact that the parameters were reversed. The target server may then transmit a request for additional information which comprises a message asking if the reverse was intended by the user.

Prompting operation 302 may also comprise displaying a plurality of forms in sequence. After submitting a form such as the exemplary form described above, an additional form may be displayed. This process may be repeated until each form in the sequence has been displayed.

In an embodiment of the present invention, the form is overlaid within a window belonging to the application or other computer program product which originally transmitted the procedure request. In another embodiment of the present invention, the form is displayed in a separate window from any window belonging to the application. Specifically, for an application executing within a web browser, a pop-up window may be opened and the form may be displayed within the pop-up window. The pop-up window may be opened by code located in the browser which is not visible to the application.

Prompting operation 302 may interact with the user via input means other than a form. For example, prompting operation 302 may prompt a user for graphical input. Prompting operation 302 may also prompt a user for speech input. Prompting operation 302 may also comprise transmitting an instant message to a user.

In an embodiment of the present invention, prompting operation 302 is performed by computer code written in the JavaScript programming language and executing within a web browser. In another embodiment of the present invention, prompting operation 302 is performed by computer code written for the Java language and platform. The Java code may permit the target server to display information within specific sections of a computer screen or other display medium.

The user may be a developer of an application which includes the procedure invoked by the procedure request. In this case, any configuration information submitted as additional information may train the application. Specifically, the application may record the configuration information received. Once such training by developers is complete, the configuration of the application may be locked before the application is distributed to end users.

The user may also be in close communication with the developers of an application. Additionally, there may not be a clear distinction between the users and the developers of an application. It is contemplated that the present invention is particularly advantageous in either case. For example, a patent tracking application employing the present invention could be configured directly by the legal department which uses the application. As another example, an application for a small business without an information technology department could be configured directly by the small business's non-technical staff.

Prompting operation 302 is not restricted to collecting information from a user. Prompting operation 302 may additionally collect information from other sources, such as the service implementation itself.

After prompting operation 302 is completed, and after the user has submitted the additional information requested thereby, control passes to receiving operation 304.

At receiving operation 304, the additional information from the user is received at the middleware system. Receiving operation 304 is configured to receive information in the format requested by prompting operation 302.

Receiving operation 304 may be followed by transmitting operation 220 of FIG. 2B. In this case, transmitting operation 220 transmits the additional information received at receiving operation 304 to the target server.

Figure 4:
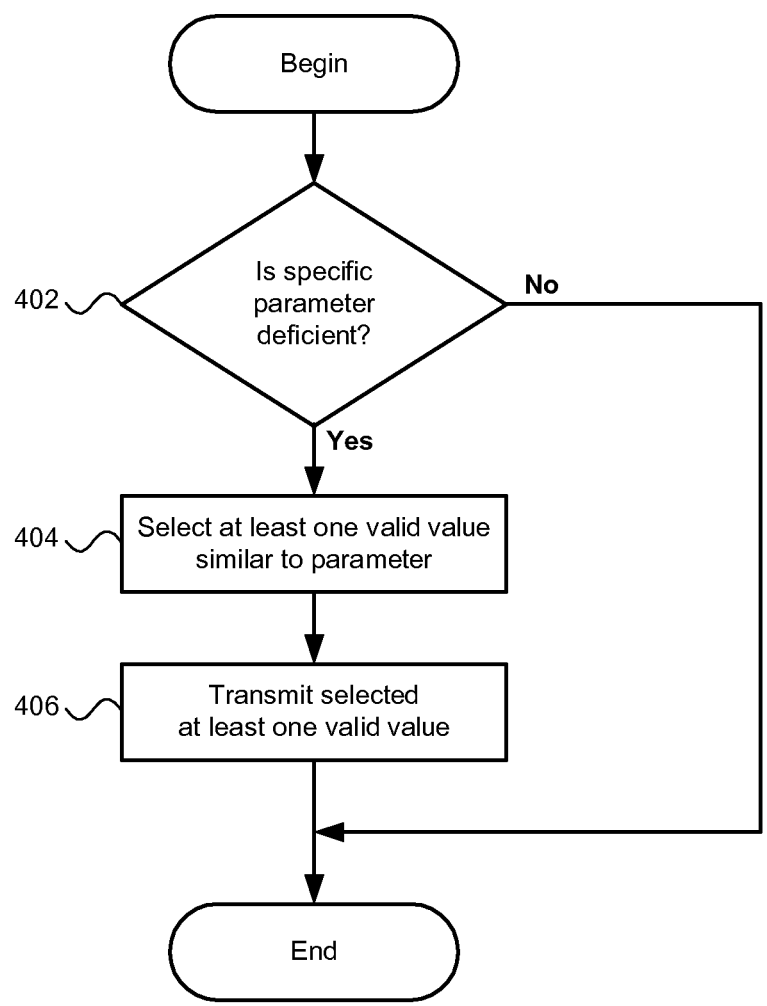
FIG. 4 shows an exemplary sequence of operations to provide a list of valid values similar to a supplied parameter.

Turning now to FIG. 4, an exemplary sequence of operations to provide a list of valid values similar to a supplied parameter is shown.

The exemplary operations demonstrated in FIG. 4 may be performed by a target server such as the server 106 shown in FIG. 1. It is contemplated that the target server performs the exemplary operations demonstrated herein after receiving additional information at receiving operation 222 of FIG. 2B. The operations described herein may be substeps of determining operation 224 of FIG. 2B.

Additional information may include a combination of parameters which are associated with a plurality of valid values and parameters which are free-form in nature. Thus, the additional information received may include a plurality of parameters which are associated with a plurality of valid values. In this case, it is contemplated that the operations shown in FIG. 4 may be repeated for each such parameter. Conversely, additional information may include only parameters which are free-form in nature. In this case, the operations shown in FIG. 4 may be omitted for this additional information.

At determining operation 402, it is determined whether, in the additional information received at the target server, a specific parameter is deficient. A parameter included in the additional information may be considered to be deficient for any of the reasons previously discussed regarding determining operation 206 of FIG. 2A. If the specific parameter is determined to be deficient, control passes to selecting operation 404. Otherwise, processing is complete for this specific parameter.

At selecting operation 404, a plurality of valid values is considered. The plurality of valid values may include any values which are possibly valid for the specific parameter. For example, the plurality of valid values may include a list of names of tables in a database. The plurality of valid values may also include a list of names of personnel who participate in a business process. At least one valid value may be selected from the plurality of valid values. The selection may be based on similarity to the specific parameter. In an embodiment of the present invention, a "fuzzy" match is performed to compare the specific parameter with each of the plurality of valid values.

It is noted that selecting operation 404 may determine that none of the plurality of valid values are sufficiently similar to the specific parameter. A variety of actions may be taken in response to this condition. For example, an exception condition may be raised. The specific parameter may be requested based on free-form data entry instead of a predefined list of valid values. Selecting operation 404 may also be repeated based on relaxed selection criteria.

Those skilled in the art will appreciate that users often provide parameter values that, while invalid, are almost correct. Selecting operation 404 may advantageously compensate for this type of user error. For example, suppose that a procedure request invokes a data-query service. A search string input by a user is included in the procedure request as a parameter. If a query based on the parameter includes no results, the data-query service may perform a "fuzzy" match between the parameter and the data in the database. Any results returned by the fuzzy match may be selected by selecting operation 404.

As another example, suppose that a procedure request invokes a workflow service. A name input by a user is included in the procedure request as a parameter. The parameter does not exactly match any of a list of names of personnel who participate in a business process. However, if it is detected that the parameter approximates the name of several persons in the list, the names which match approximately may be selected by selecting operation 404.

After selecting operation 404 is completed, and after the user has submitted the additional information requested thereby, control passes to transmitting operation 406.

At transmitting operation 406, the selected at least one valid value is transmitted to the middleware system. Transmitting operation 406 may comprise including the selected at least one valid value in a request for additional information which is transmitted to the middleware system at a later point in time. Specifically, the selected at least one valid value may be included in the request transmitted at requesting operation 216 of FIG. 2B.

It is emphasized that transmitting operation 406 may cause a user to be prompted to select one of the valid values selected at selecting operation 404. For example, a request for additional information may specify that the name of a person involved in a business process should be transmitted as a parameter. The request for additional information may additionally include the names which matched approximately as determined in the example above. This may cause prompting operation 302 of FIG. 3 to prompt the user to select one of the names included in the list.

Figure 5:
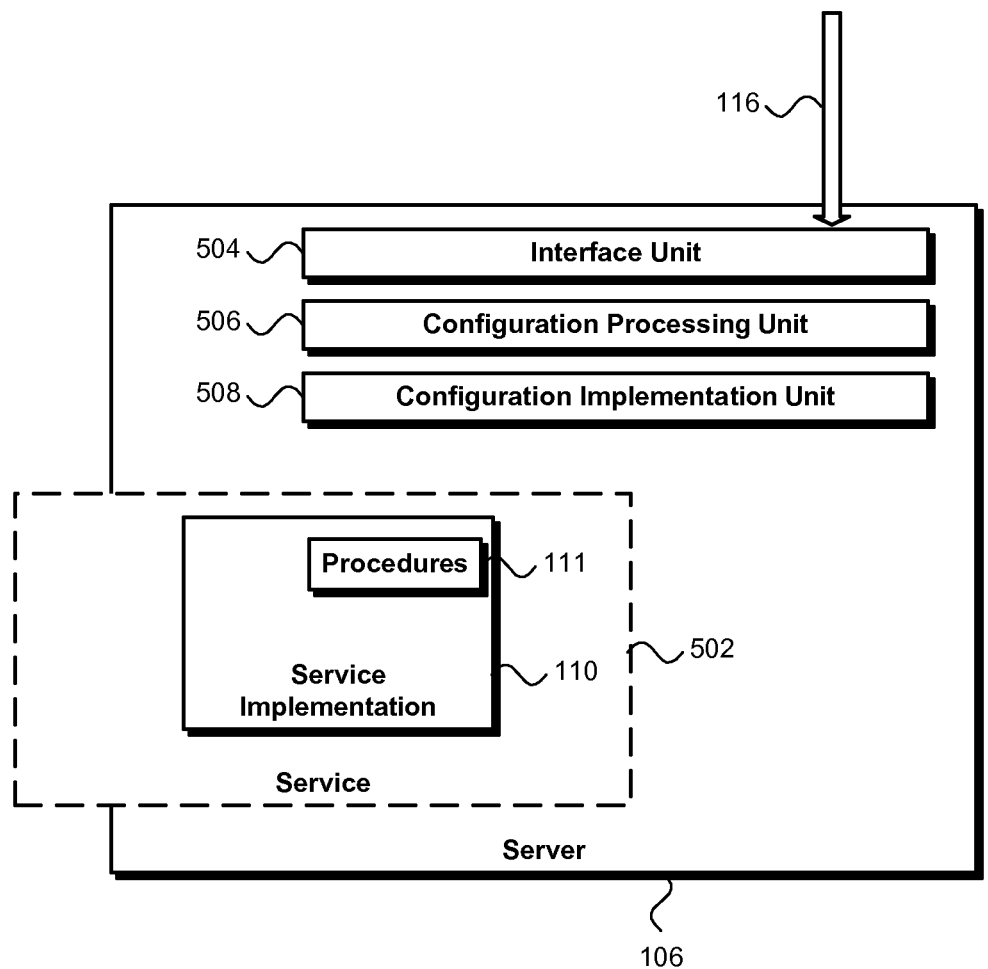
FIG. 5 shows an exemplary target server embodying the present invention.

Turning now to FIG. 5, an exemplary target server embodying the present invention is demonstrated.

The target server 106 includes one or more services 502. A service may be, for example, an interactive computing service. A service may implement the Service Oriented Architectures paradigm. A service may be designed to accomplish any of a wide variety of goals.

It is not necessary for the service 502 to be located entirely at the target server 106. In particular, a subset of the service may be located at a client such as the exemplary client shown in FIG. 6. Moreover, a subset of the service may be located at a different server or entirely outside the system 102.

A service 502 may comprise one or more service implementations 110. A service may additionally comprise interfaces which allow other programs to communicate with the services. Exemplary interfaces are displayed in the exemplary client of FIG. 6.

A service 502, or its definition or service implementation 110 may comprise a list of required information. Determining operation 208 on FIG. 2A may consult this list to determine whether any information thereon is absent.

A service 502 may be configured to compensate for user error. Compensating for user error may be based on a history of at least one previous invocation of the service. Compensating for user error may be further based on the additional information received at the target server 106 during the at least one previous invocation of the service. The additional information may be received as out-of-band communication from a middleware server in response to a request. Moreover, the additional information may comprise responses submitted by a user. Compensating for user error may be automatic. For example, if a user has a history of consistently swapping the values of two parameters submitted to a service API, the service may choose to configure subsequent service requests from this user to reflect this history. This could be achieved by, for example, reversing the parameter values instead of requesting additional information from the user via the middleware system. Thus, the service's previous out-of-band communications are employed to eliminate subsequent explicit configuration interactions.

Clearly, it is undesirable for repeated invocations of the same service to require a user to repeatedly enter the same information. Therefore, in an embodiment of the present invention, service calls from an application are tracked. The information provided from the user is then reused on subsequent invocations of the service. In a further embodiment of the present invention, machine-learning techniques are applied to determine the correct manner in which to reuse user-supplied information. For example, a set of features may be generated for each service call. Bayesian techniques may then be applied to choose the correct information to be reused from previous user interactions. These techniques advantageously avoid asking questions to a user when previous interactions have already provided an answer to the question.

The target server 106 further comprises an interface unit 504. The interface unit may be configured to communicate with systems other than the target server. The interface unit is configured to receive a procedure request 116 to perform a procedure. The procedure request may require at least one parameter. Specifically, the interface unit may perform receiving operation 204 of FIG. 2A. The interface unit may also be configured to transmit a result of executing the procedure request to the system which initiated the procedure request. Specifically, the interface unit may perform transmitting operation 212 of FIG. 2A.

The target server 106 further comprises a configuration processing unit 506. The configuration processing unit is configured to detect at least one deficient parameter in the procedure request. Specifically, the configuration processing unit may perform determining operation 206 and determining operation 208 of FIG. 2A.

The configuration processing unit 506 is further configured to suspend processing of the procedure request. Specifically, the configuration processing unit may perform suspending operation 214 of FIG. 2B.

The configuration processing unit 506 is further configured to request additional information from the middleware system to correct at least one deficient parameter in the procedure request. Specifically, the configuration processing unit may perform requesting operation 216 of FIG. 2B. The configuration processing unit may initiate the request and may cause the interface unit 504 to transmit the request to the middleware system.

The configuration processing unit 506 is further configured to resume the procedure request upon receiving the additional information. Specifically, the configuration processing unit may perform receiving operation 222 of FIG. 2B and executing operation 210 of FIG. 2A. The interface unit 504 may receive the additional information and may retransmit the received additional information to the configuration processing unit.

The configuration processing unit 506 may also be configured to determine whether, in the requested additional information received at the target server, at least one parameter is deficient. Specifically, the configuration processing unit may perform determining operation 224 of FIG. 2B. The configuration processing unit is further configured to, upon a determination that at least one parameter is deficient, repeat the steps of requesting the additional information from the middleware system and determining whether at least one parameter is deficient until a condition wherein at least one parameter is deficient is determined not to exist. Specifically, the configuration processing unit may iteratively repeat requesting operation 216, receiving operation 222 and determining operation 224 of FIG. 2B in the manner described above regarding determining operation 224.

The configuration processing unit 506 may further be configured to generate a list of valid values similar to a supplied parameter. Such a supplied parameter may be contained either in the original procedure request or in additional information requested. Specifically, the configuration processing unit 506 may perform any of the method steps described in regards to FIG. 4.

The target server 106 may further comprise a configuration implementation unit 508. The configuration implementation unit is configured to configure a service based on the additional information. Configuring the service may additionally be based on additional information received at the target server 106 during a previous invocation of the service. More broadly, configuring the service may integrate the additional information with other information to configure the service.

Figure 6:
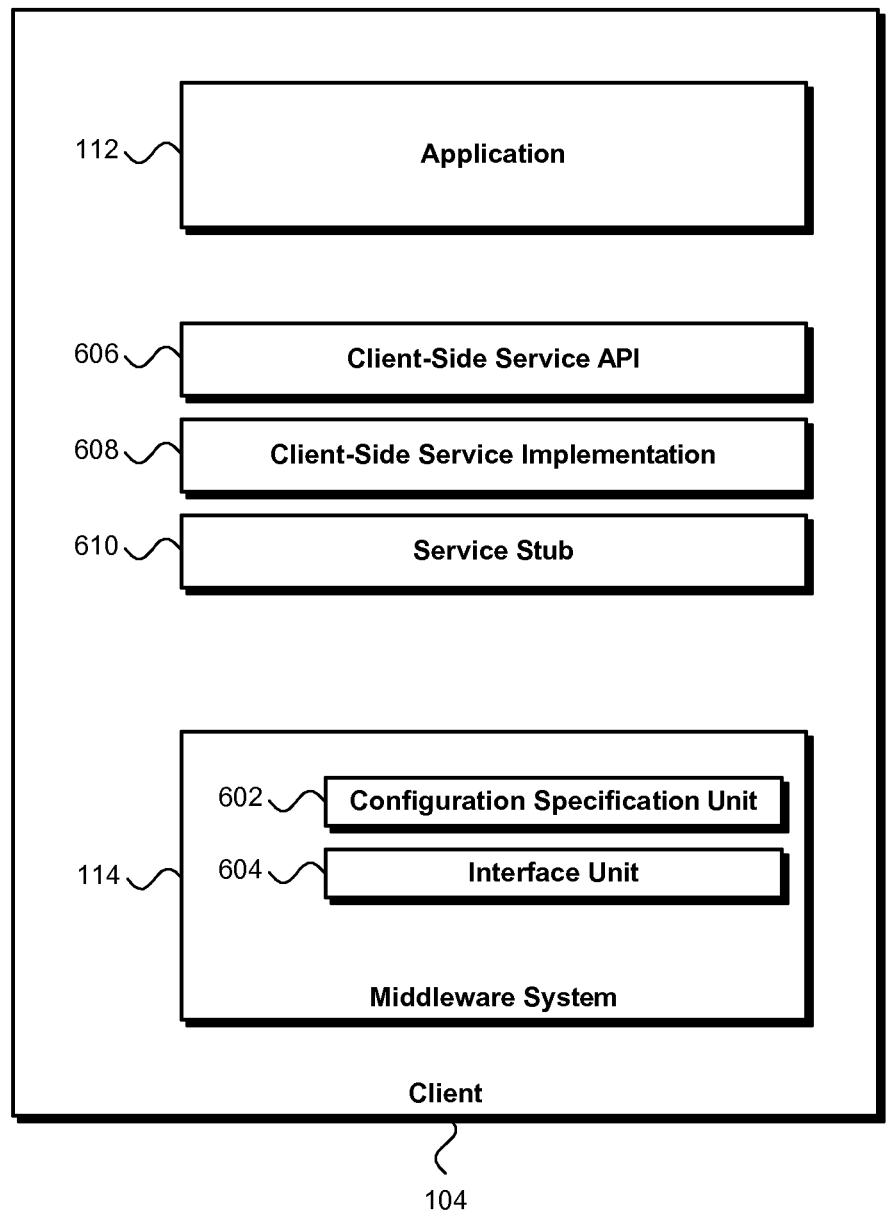
FIG. 6 shows an exemplary client and middleware system embodying the present invention.

Turning now to FIG. 6, an exemplary client and middleware system embodying the present invention is demonstrated.

In the exemplary system shown herein, the client 104 includes a middleware system 114. The middleware system 114 may be generic service-stub middleware.

The middleware system 114 and the target server may be contained within a client-server system architecture. Said architecture may additionally contain the client 104.

The middleware system 114 may comprise a configuration specification unit 602. The configuration specification unit is configured to receive a request for additional information to correct at least one deficient parameter in a procedure request. Specifically, the configuration specification unit may perform receiving operation 217 of FIG. 2B. The configuration specification unit is further configured to transmit the additional information in response to the request. Specifically, the configuration specification unit may perform transmitting operation 220 of FIG. 2B.

The middleware system may also comprise an interface unit 604. The interface unit is configured to prompt a user to obtain the additional information. The interface unit is further configured to receive the additional information from the user. Specifically, the interface unit may perform the exemplary operations shown in FIG. 3.

The client 104 further includes one or more applications 112. Each application may include invocations to one or more client-side service APIs 606. In an embodiment of the present invention, the client-side service APIs contain a subset of the service implementation. This subset may be provided as JavaScript function implementations 608 inside a web browser.

Each client-side service API 606 may also be associated with a service stub 610. The service stub mediates between the client-side service API and the middleware server 114. The middleware server, in turn, mediates between the client 104 and target server on each invocation of a client-side service API. When an application 112 invokes a client-side service API, the information passed on the function call is transmitted by the middleware system to a service implementation executing at a target server.

The service stub 610 may additionally display a form to a user to collect additional information from a user. The form may be similar in nature to the exemplary forms described above regarding FIG. 3.

In an embodiment of the present invention, the invocation of a service by the client 104 is associated with a user callback function. The invocation of the service API is performed using asynchronous XMLHttpRequest, hereinafter abbreviated XHR, to transmit the procedure request to the target server. Upon successful completion of the procedure request, the callback function may be invoked in order to cause the application 112 to continue execution.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

The invention claimed is:

1. A method for flexible service configuration for handling incorrect or incomplete user inputs, the method comprising:
   receiving a procedure request to perform a procedure at a target workflow server over a first communication path using an application programming interface (API), the procedure request requiring at least one parameter, the procedure request configured to initiate an executable workflow procedure, wherein the procedure request is an asynchronous Extensible Markup Language Hypertext Transfer Protocol Request (XHR);
   detecting by the target workflow server at least one valid but deficient parameter in the procedure request, the at least one valid but deficient parameter being unrelated to user authentication, wherein the at least one valid but deficient parameter is at least one of a parameter that causes loss of data or a parameter outside a specified range of parameter values;
   suspending processing of the procedure request before execution of the executable workflow procedure when the at least one valid but deficient parameter is detected;
   sending an information request by the target workflow server for additional information from a middleware system to correct the at least one valid but deficient parameter in the procedure request over a second communication path, the second communication path being different than the first communication path, the information request comprising an exception and including an identity of the at least one valid but deficient parameter, an explanation of how the at least one valid but deficient parameter is deficient, and a description of at least one of an input field name, a data type, or a list of database tables;
   resuming the procedure request upon receiving the additional information, the additional information including configuration information to configure at least one of a database system, a database schema, or a table, wherein machine-learning techniques are applied to determine a manner in which to reuse the additional information; and
   reusing the additional information in subsequent procedure requests with the at least one valid but deficient parameter to correct the at least one valid but deficient parameter in the subsequent procedure requests without sending the information request by the target workflow server for the additional information from the middleware system.

2. The method of claim 1, further comprising:
   prompting a user to obtain the additional information by the middleware system;
   receiving the additional information from the user at the middleware system; and
   transmitting the additional information from the middleware system to the target workflow server.

3. The method of claim 2, wherein prompting the user comprises displaying at least one form to the user.

4. The method of claim 1, further comprising:
   determining whether, in the additional information received at the target workflow server, at least one parameter is deficient; and
   upon a determination that at least one parameter is deficient, repeating the steps of requesting the additional information from the middleware system and determining whether at least one parameter is deficient until a condition wherein at least one parameter is deficient is determined not to exist.

5. The method of claim 1, further comprising:
determining whether, in the additional information received at the target workflow server, a specific parameter is valid but deficient; and
upon determining that the specific parameter is valid but deficient:
    selecting, from a plurality of valid and not deficient values, at least one valid and not deficient value being similar to the specific parameter determined to be valid but deficient; and
    transmitting the selected at least one valid and not deficient value to the middleware system.

6. The method of claim 1, further comprising configuring a service based on the additional information.

7. The method of claim 6, wherein configuring the service is additionally based on the additional information received at the target workflow server during a previous invocation of the service.

8. The method of claim 6, further comprising compensating for user error based on a history of at least one previous invocation of the service and further based on the additional information received at the target workflow server during at least one previous invocation of the service.

9. A system for flexible service configuration for handling incorrect or incomplete user inputs, the system comprising:
    a middleware system comprising:
        a configuration specification unit configured to receive a request for additional information to correct at least one valid but deficient parameter in a procedure request and to transmit the additional information in response to the request, the procedure request configured to initiate an executable workflow procedure, wherein the procedure request is an asynchronous Extensible Markup Language Hypertext Transfer Protocol Request (XHR); and
    a target workflow server comprising:
        an interface unit configured to receive a procedure request to perform a procedure over a first communication path, the procedure request requiring at least one parameter; and
        a configuration processing unit configured to:
            detect at least one valid but deficient parameter in the procedure request, the at least one valid but deficient parameter being unrelated to user authentication, wherein the at least one valid but deficient parameter is at least one of a parameter that causes loss of data or a parameter outside a specified range of parameter values;
            suspend processing of the procedure request before execution of the executable workflow procedure when the at least one valid but deficient parameter is detected;
            request additional information from the middleware system to correct the at least one valid but deficient parameter in the procedure request over a second communication path, the second communication path being different than the first communication path, the request for the additional information comprises an exception and includes an identity of the at least one valid but deficient parameter, an explanation of how the at least one valid but deficient parameter is deficient, and a description of at least one of an input field name, a data type, or a list of database tables;
            resume the procedure request upon receiving the additional information, the additional information including configuration information to configure at least one of a database system, a database schema, or a table, wherein machine-learning techniques are applied to determine a manner in which to reuse the additional information; and
            reuse the additional information in subsequent procedure requests with the at least one valid but deficient parameter to correct the at least one valid but deficient parameter in the subsequent procedure requests without requesting the additional information from the middleware system.

10. The system of claim 9, wherein the target workflow server and the middleware system are contained within a client-server system architecture.

11. The system of claim 9, wherein the middleware system further comprises an interface unit configured to:
    prompt a user to obtain the additional information; and
    receive the additional information from the user.

12. The system of claim 9, wherein the target workflow server further comprises a configuration implementation unit for configuring a service based on the additional information.

13. A computer program product embodied in computer readable memory comprising:
    computer readable program codes coupled to the computer readable memory for flexible service configuration for handling incorrect or incomplete user inputs, the computer readable program codes configured to cause the program to:
    receive a procedure request to perform a procedure over a first communication path, the procedure request requiring at least one parameter, the procedure request configured to initiate an executable workflow procedure, wherein the procedure request is an asynchronous Extensible Markup Language Hypertext Protocol Request (XHR);
    detect at least one valid but deficient parameter in the procedure request, the at least one valid but deficient parameter being unrelated to user authentication, wherein the at least one valid but deficient parameter is at least one of a parameter that causes loss of data or a parameter outside a specified range of parameter values;
    suspend processing of the procedure request before execution of the executable workflow procedure when the at least one valid but deficient parameter is detected;
    request additional information from a middleware system to correct the at least one valid but deficient parameter in the procedure request, the request for the additional information comprises an exception and includes an identity of the at least one valid but deficient parameter, an explanation of how the at least one valid but deficient parameter is deficient, and a description of at least one of an input field name, a data type, or a list of database tables;
    resume the procedure request upon receiving the additional information over a second communication path, the second communication path being different than the first communication path, the additional information including configuration information to configure at least one of a database system, a database schema, or a table, wherein machine-learning techniques are applied to determine a manner in which to reuse the additional information; and
    reuse the additional information in subsequent procedure requests with the at least one valid but deficient parameter to correct the at least one valid but deficient parameter in the subsequent procedure requests without requesting the additional information by the middleware system.

14. The computer program product of claim 13, wherein the computer readable program codes are further configured to cause the program to:
prompt a user to obtain the additional information;
receive the additional information from the user; and
transmit the additional information to a target workflow server.

15. The computer program product of claim 14, wherein prompting the user comprises displaying at least one form to the user.

16. The computer program product of claim 13, wherein the computer readable program codes are further configured to cause the program to:
determine whether, in the additional information, at least one parameter is valid but deficient; and
upon a determination that the at least one parameter is valid but deficient, repeating the steps of requesting the additional information from the middleware system and determining whether the at least one parameter is valid but deficient until a condition wherein at least one parameter is valid but deficient is determined not to exist.

17. The computer program product of claim 13, wherein the computer readable program codes are further configured to cause the program to:
determine whether, in the additional information, a specific parameter is valid but deficient; and
upon determining that the specific parameter is valid but deficient:
select, from a plurality of valid and not deficient values, at least one valid and not deficient value being similar to the specific parameter determined to be valid but deficient; and
transmit the selected at least one valid and not deficient value to the middleware system.

18. The computer program product of claim 13, wherein the computer readable program codes are further configured to cause the program to configure a service based on the additional information.

19. The computer program product of claim 18, wherein configuring the service is additionally based on the additional information received during a previous invocation of the service.

20. The computer program product of claim 18, wherein the computer readable program codes are further configured to cause the program to compensate for user error based on a history of at least one previous invocation of the service and further based on the additional information received during the at least one previous invocation of the service.

* * * * *